(12) United States Patent
Nakamori

(10) Patent No.: US 8,526,123 B2
(45) Date of Patent: Sep. 3, 2013

(54) ELECTRONIC APPARATUS

(75) Inventor: Kanae Nakamori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 111 days.

(21) Appl. No.: 13/297,616

(22) Filed: Nov. 16, 2011

(65) Prior Publication Data

US 2012/0127593 A1    May 24, 2012

(30) Foreign Application Priority Data

Nov. 19, 2010 (JP) ................................. 2010-258604

(51) Int. Cl.
G02B 15/14 (2006.01)
(52) U.S. Cl.
USPC ........................................... 359/697; 359/694
(58) Field of Classification Search
USPC ................... 359/694–704, 811–824
See application file for complete search history.

(56) References Cited

U.S. PATENT DOCUMENTS 7,574,126 B2 * 8/2009 Honjo et al. .................... 396/97
8,363,334 B2 * 1/2013 Murakami .................... 359/694

FOREIGN PATENT DOCUMENTS

JP    2008-186651 A    8/2008

* cited by examiner

*Primary Examiner* — Mohammed Hasan
(74) *Attorney, Agent, or Firm* — Canon U.S.A., Inc., IP Division

(57) ABSTRACT

A control unit starts a first operation when a first detection unit detects rotation of an operation member in a first direction by an angle not less than a first angle and changes a control value for the first operation when a second detection unit detects rotation of the operation member in the first direction by an angle not less than a third angle larger than the first angle. Furthermore, the control unit starts a second operation when the second detection unit detects rotation of the operation member in a second direction by an angle not less than a fourth angle and changes a control value for the second operation when the first detection unit detects rotation of the operation member in the second direction by an angle not less than a second angle larger than the fourth angle.

8 Claims, 9 Drawing Sheets

SECTION A-A

SECTION A-A

TOP VIEW

FRONT VIEW

SECTION B-B

TOP VIEW

FRONT VIEW

SECTION C-C

TOP VIEW

FRONT VIEW

CLOCKWISE ROTATING ANGLE

COUNTERCLOCKWISE ROTATING ANGLE

SECTION D-D

TOP VIEW

FRONT VIEW

ELECTRONIC APPARATUS

BACKGROUND OF THE INVENTION

1. Field of the Invention

The one of the aspects of the present invention relates to an electronic apparatus having an operation member rotatable in a first direction and a second direction from an initial state with respect to a main body.

2. Description of the Related Art

Conventionally, in an electronic apparatus such as an imaging apparatus, there is provided a function by which the focal distance of an imaging optical system is changed, which is known as zoom function. In such an imaging apparatus, the imaging apparatus external portion is provided with a zoom operation member for executing the zoom function; when the operation member is operated in a first direction from a neutral position (non-operating position), it is possible to switch the focal distance of the imaging optical system to a wide-angle direction. On the other hand, when the operation member is operated in a second direction from the neutral position, it is possible to switch the focal distance of the imaging optical system to a telephoto direction.

In recent years, there has been proposed an imaging apparatus in which it is possible to change the focal distance changing speed (zoom speed) in the zoom function from low speed to high speed.

For example, Japanese Patent Application Laid-Open No. 2008-186651 discusses an electronic apparatus having a first switch which is switched through operation of an operation member from a non-operating position by a first operation amount, and a second switch which is switched through operation of the operation member from the non-operating position by a second operation amount that is larger than the first operation amount. The first switch has a switching lever portion configured to move through movement of the operation member, and the second switch is configured to be switched through abutment of an end portion in the operating direction of the operation member. In response to switching of the first switch, zoom operation is performed at a first speed, and, in response to switching of the second switch, zoom operation is performed at a second speed higher than the first speed, whereby it is possible to change the zoom speed.

However, in the electronic apparatus discussed in Japanese Patent Application Laid-Open No. 2008-186651, it is necessary to provide at least three detection switches to effect switching of the first switch and of the second switch. Thus, it is necessary to secure the requisite space for the detection switches, which constitutes an obstacle to a reduction in the size of the apparatus main body.

SUMMARY OF THE INVENTION

According to an aspect of the present invention, a control unit starts a first operation when a first detection unit detects rotation of an operation member in a first direction by an angle not less than a first angle and changes a control value for the first operation when a second detection unit detects rotation of the operation member in the first direction by an angle not less than a third angle larger than the first angle. Furthermore, the control unit starts a second operation when the second detection unit detects rotation of the operation member in a second direction by an angle not less than a fourth angle and changes a control value for the second operation when the first detection unit detects rotation of the operation member in the second direction by an angle not less than a second angle larger than the fourth angle.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
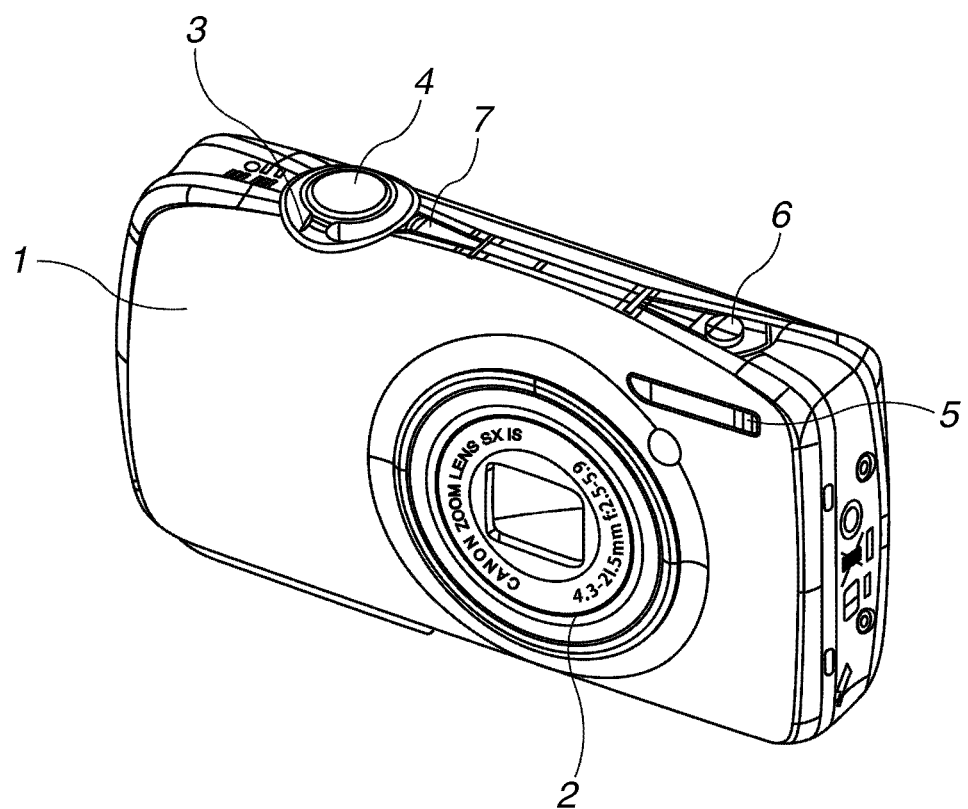
FIG. 1 is an external perspective view of a digital camera according to a first exemplary embodiment of the present invention.
Figure 2A:
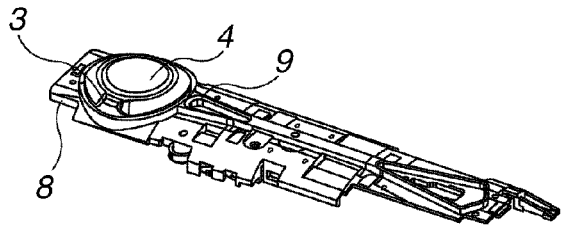
FIGS. 2A through 2E are diagrams illustrating the construction of a top unit of the digital camera according to the first exemplary embodiment.
Figure 2B:
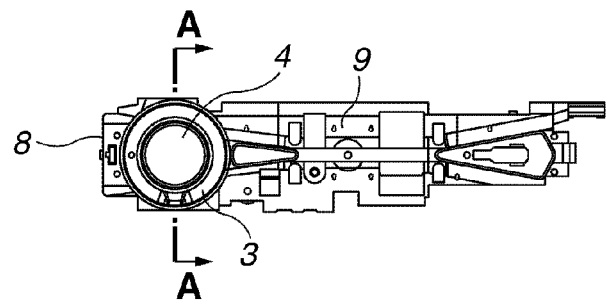
Figure 2C:
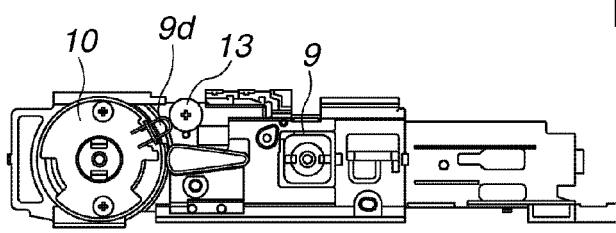
Figure 2D:
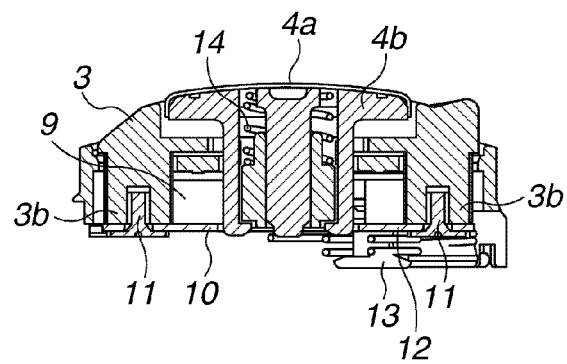
Figure 2E:
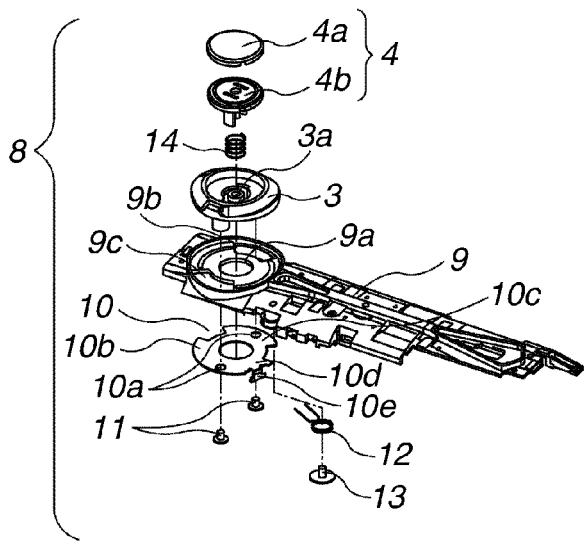

The first exemplary embodiment will be illustrated. FIG. 1 is an external perspective view of a digital camera according to the first exemplary embodiment of the present invention. In FIG. 1, at the center of a front surface of a camera main body, there is provided a lens barrel 2 retaining a photographing lens; through movement of the photographing lens in the optical axis direction, the focal distance of the photographing lens is varied. In the present exemplary embodiment, the photographing lens is a zoom lens, which is composed of a plurality of lenses; through movement of the lens position, it is possible to change the focal distance, in other words, the zoom magnification. The zoom thus effected by a zoom lens is generally referred to as optical zoom. On the other hand, the digital camera according to the present exemplary embodiment also has an electronic zoom function. In this electronic zoom, a part of an image signal from an imaging apparatus is displayed in an enlarged form, thereby changing the zoom magnification.

On the upper surface of the camera main body 1, there is provided a zoom lever 3, which is operated in order to change the magnification of the optical and electronic zoom mentioned above. The zoom lever 3 is formed in a cylindrical configuration, and is rotatable around the center axis of the cylinder within a predetermined range both clockwise (in a first direction) and counterclockwise (in a second direction). According to the rotating direction, the zoom magnification can be changed to a wide-angle direction or a telephoto direction. Further, according to the operation amount of the zoom lever 3, it is possible to change the control value for the zoom magnification changing operation, in other words, the zoom speed (the changing speed at the time of changing the zoom magnification).

At the center of the zoom lever 3, there exists a release button 4, which allows detection of pressing operation in two stages. By half-pressing operation on the release button (pressing operation in one stage), a photographing preparation operation (such as light metering operation and distance metering operation) is started. Through full-pressing operation on the release button 4 (pressing operation in two stages), an image of the subject is taken, and image data on the subject image is recorded on a recording medium. In the vicinity of the zoom lever 3, there exists a power source button 7, which turns on/off the main power source of the camera.

On the upper right-hand side of the front surface of the camera main body 1, there is provided a flash emission window 5, which emits flash according to captured scene, for example, when the subject is in the dark.

A mode switch 6 is provided above the flash emission window 5. The mode switch 6 is slidable to the right and left and allows selection among three photographing mode of an AUTO mode, camera mode, and moving picture mode. The AUTO mode is a still image taking mode in which photographing is started with no setting made on the camera; the camera mode is a mode in which still image taking is performed after manual camera setting such as selection of a program chart for shutter and diaphragm or prohibition of flash emission.

Next, the construction of a top unit 8 including the zoom lever 3 will be illustrated in detail with reference to FIGS. 2A through 2E. FIGS. 2A through 2E are perspective view, top view, bottom view, sectional view, and development view, respectively, of the top unit 8.

A top base 9 has a base hole portion 9a and two arc hole portions 9b and 9c. The zoom lever 3 has a rotation shaft, at the center of which there is provided a button hole portion 3a. The rotation shaft of the zoom lever 3 is passed through the base hole portion 9a provided in the top base 9, whereby the zoom lever 3 is rotatable around the rotation shaft. The zoom lever 3 is provided with a set of mounting bosses 3b. The mounting bosses 3b are passed through the two arc hole portions 9b and 9c of the top base 9, and screws 11 passed through mounting holes 10a of a zoom plate 10 are mounted to the mounting bosses 3b, whereby the zoom lever 3 and the zoom plate 10 are fixed to each other.

The zoom lever 3 and the zoom plate 10 are rotatable within a range allowing movement of the mounting bosses 3b within the two arc hole portions 9b and 9c. The zoom plate 10 is provided with sector blade portions 10b, 10c, and 10d, and a spring peg 10e bent substantially vertically.

Provided on the back side of the top base 9 is a spring mounting shaft (not illustrated), and a coil spring 12 with two arms is assembled thereto and is prevented from detachment by means of a screw 13. The two arms of the coil spring 12 are mounted so as to hold therebetween a stopper shaft 9d on the back surface of the top base 9 and the spring peg 10e. A first arm of the coil spring 12 is charged when the zoom lever 3 rotates clockwise, and urges the zoom lever 3 counterclockwise. When the zoom lever 3 rotates counterclockwise, the first arm of the coil spring 12 remains still while caught by the stopper shaft 9d on the back side of the top base 9, aiding counterclockwise urging of the zoom lever 3 by a second arm of the coil spring 12.

When the zoom lever 3 rotates counterclockwise, the second arm of the coil spring 12 is charged, and urges the zoom lever 3 clockwise. When the zoom lever 3 rotates clockwise, the second arm of the coil spring 12 remains still while caught by the stopper shaft 9d on the back side of the top base 9, aiding clockwise urging of the zoom lever 3 by the first arm of the coil spring 12.

A button spring 14 is fitted into the periphery of the button hole portion 3a of the zoom lever 3, and is mounted while charged by the release button 4. The release button 4 has a claw, which is snap-fitted into the zoom lever 3.

The release button 4 is divided into a release cap 4a and a release button leg portion 4b. Instead of being divided into the release cap 4 and the release button leg portion 4b, the release button may be formed as an integral unit. After this, the operation components such as the mode switch 6 and the power source button 7 are mounted, whereby the top unit 8 is completed.

Figure 3:
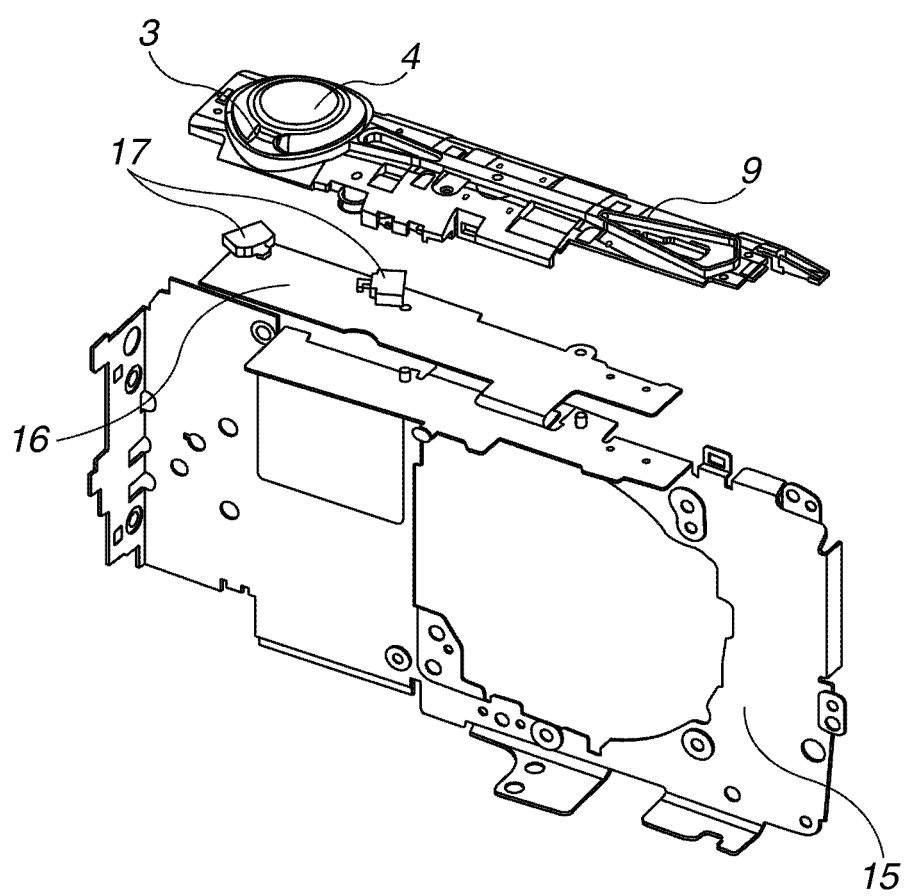
FIG. 3 is a diagram illustrating the internal structure of the digital camera according to the first exemplary embodiment.

Next, the internal structure of the camera main body 1 will be illustrated with reference to FIG. 3. A flexible board 16 is assembled to a main chassis 15.

Further, two detection switches 17a and 17b are mounted to the flexible board 16; the two detection switches 17a and 17b are arranged such that the blade portions 10b, 10c, and 10d of the zoom plate 10 do not come to the detection positions with no operation being performed on the zoom lever 3. More specifically, the second detection switch 17b is arranged between the first blade portion 10b and the second blade portion 10c, and the first detection switch 17a is arranged between the second blade portion 10c and the third blade portion 10d.

The detection switch 17a is arranged such that when the zoom plate rotates, a switch protrusion 17c protruding toward the rotation center of the zoom plate 10 is pressed by the second blade portion 10c and the third blade portion 10d. Similarly, the detection switch 17b is arranged such that when the zoom plate rotates, a switch protrusion 17c protruding toward the rotation center of the zoom plate 10 is pressed by the first blade portion 10b and the second blade portion 10c. When the respective switch protrusions 17c have been pressed by a predetermined amount, the detection switches 17a and 17b are placed in the ON state. The positions of the blade portions when the switch protrusions 17 have been pressed by the predetermined amount correspond to the detection positions of the detection switches 17a and 17b.

Next, a method of detecting the amount of operation performed on the zoom lever 3 will be illustrated with reference to FIGS. 4A through 4C and FIGS. 7A and 7B.

Figure 4A:
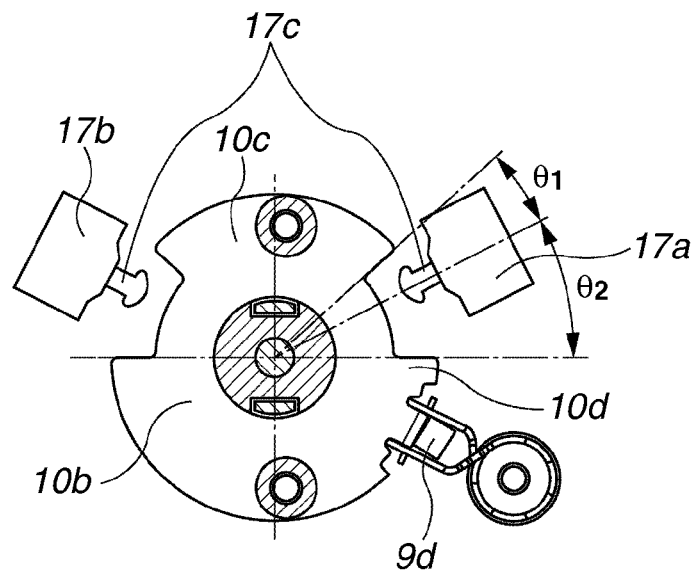
FIGS. 4A through 4C are schematic diagrams illustrating a state in which a zoom lever of the digital camera according to the first exemplary embodiment is at a neutral position.
Figure 4B:
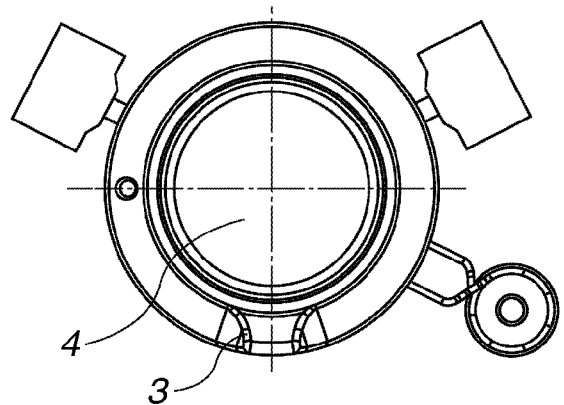
Figure 4C:
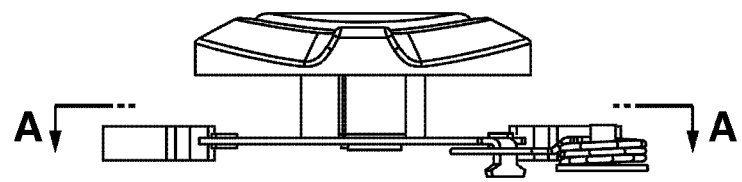

In the state illustrated in FIGS. 4A through 4C, no operation has been performed on the zoom lever 3, with the zoom lever 3 being at a neutral position. In the state in which the zoom lever 3 is at the neutral position as illustrated in FIGS. 4A through 4C, the rotating angle is 0 degrees; this state will be referred to as the initial state of the zoom lever 3. FIGS. 4A through 4C are a sectional view, a top view, and a front view, respectively, of the zoom lever 3.

As illustrated in FIG. 4A, in the initial state, the first blade portion 10b, the second blade portion 10c, and the third blade portion 10d are not at the detection positions of the two detection switches 17a and 17b. And, the switch protrusion 17c of the first detection switch 17a is pressed by the second blade portion 10c, and the first detection switch 17a is placed in the ON state; the rotating angle of this clockwise rotation will be referred to as the angle θ1 (the first rotating angle). The switch protrusion 17c of the second detection switch 17b is pressed by the first blade portion 10b, and the second detection switch 17b is placed in the ON state; the rotating angle of this clockwise rotation will be referred to as the angle θ2 (the second rotating angle). At this time, θ1<θ2; and, when the zoom plate 10 rotates clockwise, the first detection switch 17a is placed in the ON state earlier than the second detection switch 17b. Taking the operability into consideration, it is desirable for the rotating angle θ2 to be an angle not more than 90 degrees.

Figure 5A:
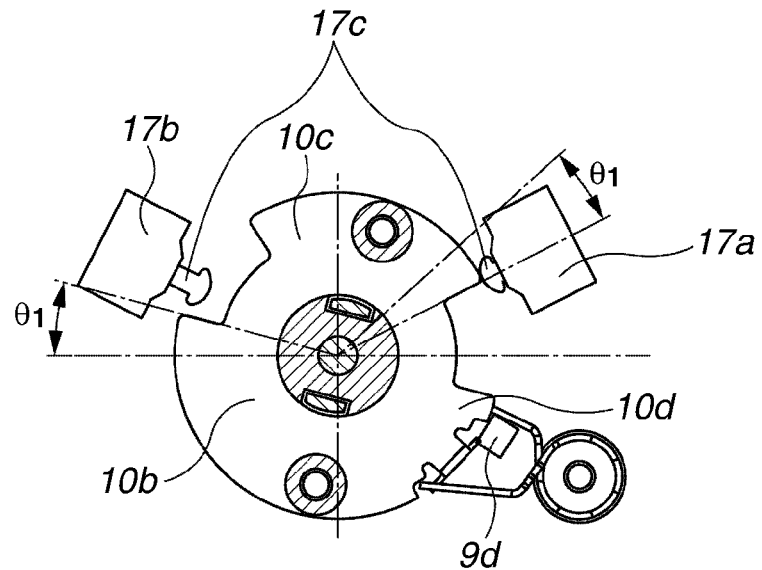
FIGS. 5A through 5C are schematic diagrams illustrating a state in which the zoom lever of the digital camera according to the first exemplary embodiment has been rotated clockwise by a rotating angle θ1.
Figure 5B:
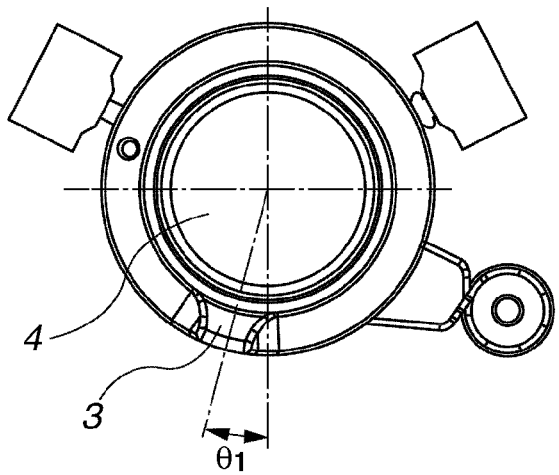
Figure 5C:
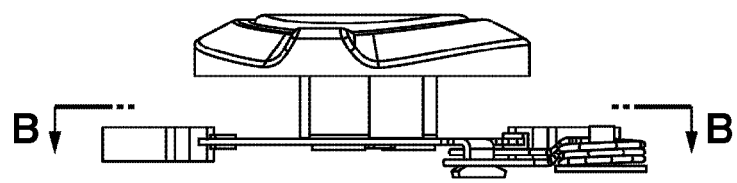

FIGS. 5A through 5C illustrate a state in which the zoom lever 3 has been rotated clockwise by the rotating angle θ1 by a force applied thereto. FIGS. 5A through 5C are a sectional view, a top view, and a front view, respectively, of the zoom lever 3.

As illustrated in FIG. 5A, when the zoom lever is rotated by the rotating angle θ1, the switch protrusion 17c of the first detection switch 17a is pressed by the second blade portion 10c, and the detection switch is placed in the ON state. In other words, the first detection switch 17a detects that the second blade portion 10c has reached the detection position. At this time, the switch protrusion 17c of the second detection switch 17b is not being pressed by the first blade portion 10b, so that the detection switch is in the OFF state. In other words, the second detection switch 17b has not detected that the second blade portion 10c has reached the detection position. Thus, the second detection switch 17b is in the OFF state, and the first detection switch 17a is in the ON state, whereby a zoom magnification changing operation (hereinafter referred to as the magnification operation) is conducted in the wide-angle direction at a predetermined speed ωl (the first speed).

Figure 6A:
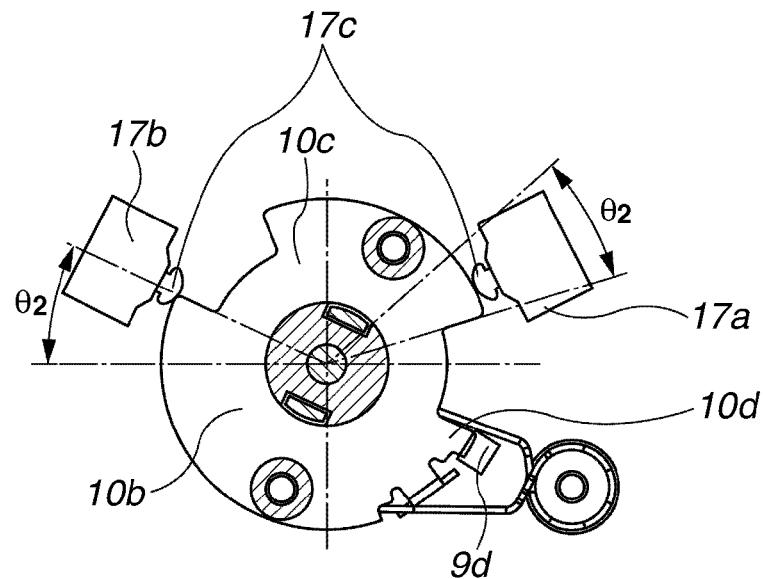
FIGS. 6A through 6C are schematic diagrams illustrating a state in which the zoom lever of the digital camera according to the first exemplary embodiment has been rotated clockwise by a rotating angle θ2.
Figure 6B:
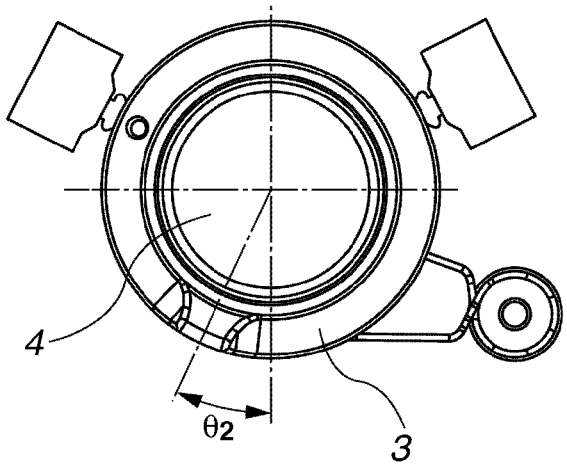
Figure 6C:
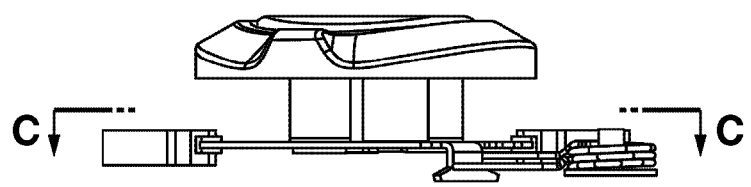

FIGS. 6A through 6C illustrate a state in which the zoom lever 3 has been rotated clockwise by the rotating angle θ2 by a force further applied thereto in the state as illustrated in FIGS. 5A through 5C. FIGS. 6A through 6C are a sectional view, a top view, and a front view, respectively, of the zoom lever 3.

As illustrated in FIG. 6A, when the zoom lever is rotated by the rotating angle θ2, the switch protrusion 17c of the second detection switch 17b is pressed by the first blade portion 10b, with the first detection switch 17a being kept ON, whereby the detection switch is placed in the ON state. In other words, the second detection switch 17b detects that the first blade portion 10b has reached the detection position. Thus, the first detection switch 17a is in the ON state, and the second detection switch 17b is in the ON state, whereby the zoom speed in the wide-angle direction is changed to a predetermined speed ω2 (the second speed), which is higher than the predetermined speed ω1.

When, in the state illustrated in FIGS. 5A through 5C or in FIGS. 6A through 6C, the operation on the zoom lever 3 is completed, the zoom lever 3 is restored to the initial state as illustrated in FIG. 4A through 4C by the force of the coil spring 12. In this case, the first detection switch 17a and the second detection switch 17b have not detected the first blade portion 10b and the second blade portion 10c, so that they are both placed in the OFF state to stop the magnification operation.

In the above-illustrated case, the zoom lever 3 is rotated clockwise to perform magnification operation in the wide-angle direction.

Contrary to the case in which it is rotated clockwise, in the case where the zoom lever 3 is rotated counterclockwise, the first detection switch 17a and the second detection switch 17b are arranged such that the second detection switch 17b is placed in the ON state earlier than the first detection switch 17a. In other words, the switch protrusion 17c of the second detection switch 17b is pressed by the second blade portion 10c, and the second detection switch 17b is placed in the ON state; the rotating angle of this counterclockwise rotation will be referred to as the angle θ1 (the first rotating angle). The switch protrusion 17c of the first detection switch 17a is pressed by the third blade portion 10d, and the first detection switch 17a is placed in the ON state; the rotating angle of this counterclockwise rotation will be referred to as the angle θ2 (the second rotating angle). The rotating angle of the counterclockwise rotation placing the second detection switch 17b in the ON state may not be θ1 so long as the second detection switch 17b is placed in the ON state earlier than the first detection switch 17a when the zoom lever 3 is rotated counterclockwise. Similarly, the rotating angle of the counterclockwise rotation placing the first detection switch 17a in the ON state may not be θ2 so long as the second detection switch 17b is placed in the ON state earlier than the first detection switch 17a when the zoom lever 3 is rotated counterclockwise.

When the zoom lever 3 is rotated counterclockwise by the rotating angle θ1, the switch protrusion 17c of the second detection switch 17b is pressed by the second blade portion 10c and the detection switch is placed in the ON state. In this way, the second detection switch 17b is placed in the ON state, with the first detection switch 17a being in the OFF state, whereby magnification operation is performed in the telephoto direction at a predetermined speed ωl (the first speed).

When the zoom lever 3 is rotated counterclockwise by the rotating angle θ21, the switch protrusion 17c of the first detection switch 17a is pressed by the third blade portion 10c and the detection switch is placed in the ON state. Thus, the second detection switch 17b is placed in the ON state, with the first detection switch 17a being in the ON state, whereby the zoom speed in the telephoto direction is changed to a predetermined speed ω2 (the second speed), which is higher than the predetermined speed ω1. While in this example the speed at which magnification operation is performed in the telephoto direction is the same as the speed at which magnification operation is performed in the wide-angle direction, it is also possible for the zoom speed to differ between the telephoto direction and the wide-angle direction.

In the case in which the zoom lever 3 is rotated clockwise by the rotating angle θ2, and in the case in which the it is rotated counterclockwise by the rotating angle θ2, the first detection switch 17a and the second detection switch 17b are in the ON state. Thus, regarding the case in which the first detection switch 17a and the second detection switch 17b are in the ON state, a detailed description will be given below with reference to FIGS. 7A and 7B.

In the present exemplary embodiment, the spring peg 10e is provided between the first blade portion 10b and the third blade portion 10d, so that the first blade portion 10b and the third blade portion 10d are separate from each other, it is also possible to adopt blade portions in which the first blade portion 10b and the third blade portion 10d are connected to each other.

Further, while in the present exemplary embodiment the second blade portion 10c presses the respective switch protrusions 17c of the first detection switch 17a and the second detection switch 17b, it is also possible to adopt a construction in which two blade portions respectively press the different switch protrusions 17c. In this case, when the zoom lever 3 is rotated, the two blade portions press the switch protrusions 17c earlier than the first blade portion 10b or the third blade portion 10d. Thus, it is desirable for the blade portions to be large enough to continue to press the switch protrusions 17c until the switch protrusions 17c is pressed by the first blade portion 10b or the third blade portion 10d.

Figure 7A:
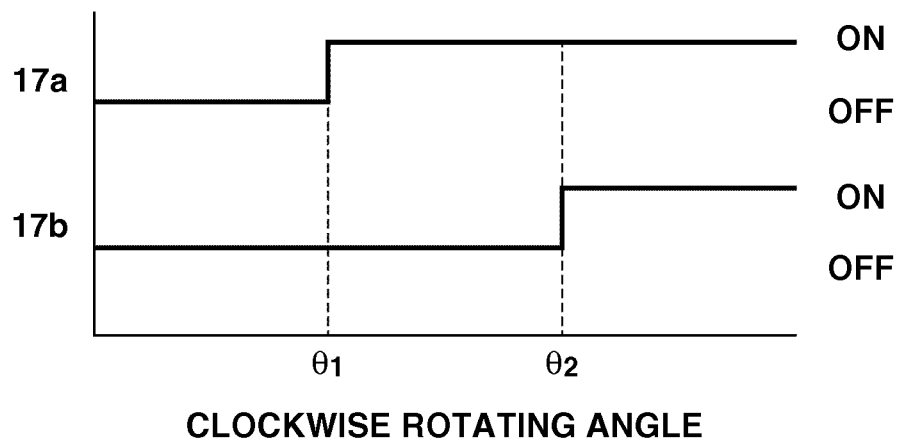
FIGS. 7A and 7B are diagrams illustrating the relationship between the output of a detection switch and the rotating angle of the zoom lever in the digital camera according to the first exemplary embodiment.
Figure 7B:
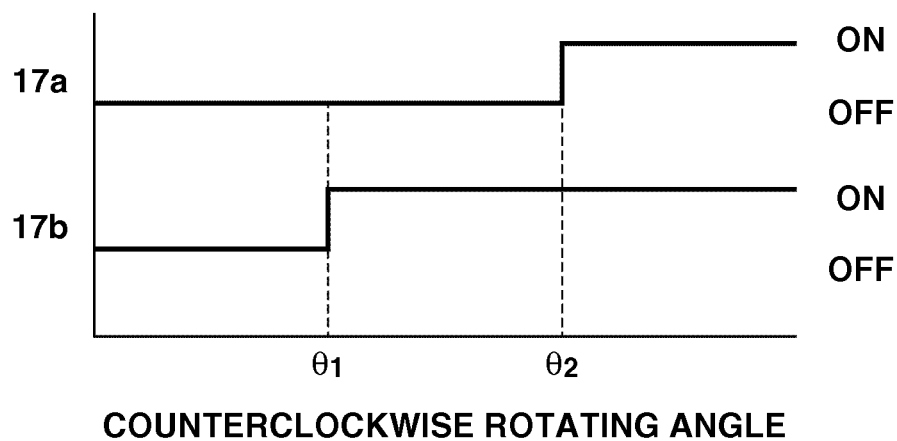

FIGS. 7A and 7B are diagrams illustrating the relationship between the output of the first detection switch 17a and the second detection switch 17b and the rotating angle of the zoom lever 3.

When the rotating angle is less than θ1, the first detection switch 17a and the second detection switch 17b have detected blade portions neither in the clockwise nor counterclockwise direction. Thus, the first detection switch 17a and the second detection switch 17b are both in the OFF state, and no magnification operation is performed.

When the rotating angle is not less than θ1 but less than θ2, only one of the first detection switch 17a and the second detection switch 17b detects the blade portions. Thus, one of the first detection switch 17a and the second detection switch 17b is in the ON state, and the other is in the OFF state, with the zoom direction and the zoom speed being selected according to the combination of the ON state and the OFF state.

When the rotating angle is not less than θ2, both the first detection switch 17a and the second detection switch 17b detect the blade portions in both the clockwise and counterclockwise directions. Thus, both the first detection switch 17a and the second detection switch 17b are in the ON state, and the zoom direction and the zoom speed are selected according to the condition of the first detection switch 17a and the second detection switch 17b (the detection result) immediately before the transition to this state. Alternatively, the zoom direction and the zoom speed are selected according to the control state of the zoom direction and the zoom speed immediately before the transition to this state. When one of the detection switch 17a and the second detection switch 17b is placed in the ON state and the other in the OFF state after both of them having been in the ON state, the zoom direction and the zoom speed are selected according to the combination of the ON state and the OFF state at that time. In other words, the zoom speed before the change is restored.

Control operations such as the selection of the zoom direction and the zoom speed and the stopping of the magnification operation are performed by a central processing unit (CPU) (not illustrated) based on the detection results of the first detection switch 17a and the second detection switch 17b.

As described above, in the present exemplary embodiment, it is possible to change the zoom speed in the wide-angle direction and the telephoto direction between low speed and high speed by means of the two detection switches 17. In other words, it is possible to detect the operation amount of the zoom lever 3 and the rotating direction of the zoom lever 3 by the two detection switches 17, enabling to reduce the requisite space for detecting the change in the operation amount of the zoom lever 3.

A second exemplary embodiment will be illustrated. Although the digital camera of the present exemplary embodiment is substantially of the same construction as that of the first exemplary embodiment, it differs therefrom in the mechanism for detecting the blade portions of the zoom plate 10.

Figure 8:
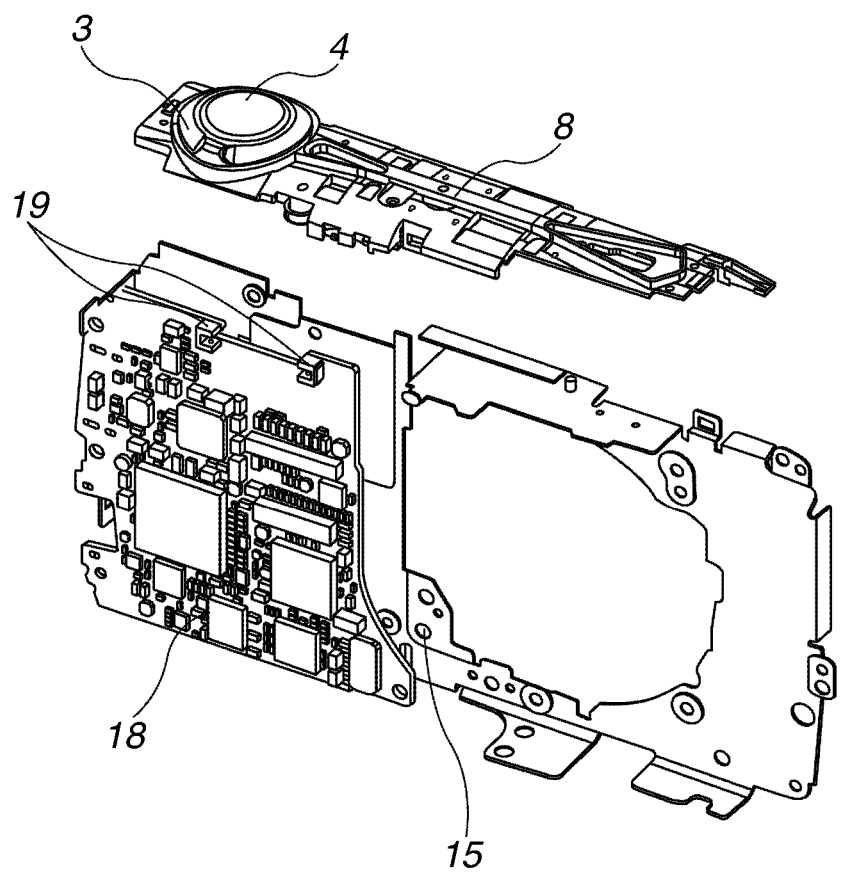
FIG. 8 is a diagram illustrating the internal structure of a digital camera according to a second exemplary embodiment.

FIG. 8 is a diagram illustrating the internal structure of the digital camera according to the present exemplary embodiment; it is a development view illustrating the top unit 8, the main chassis 15, and a main board 18.

Figure 9A:
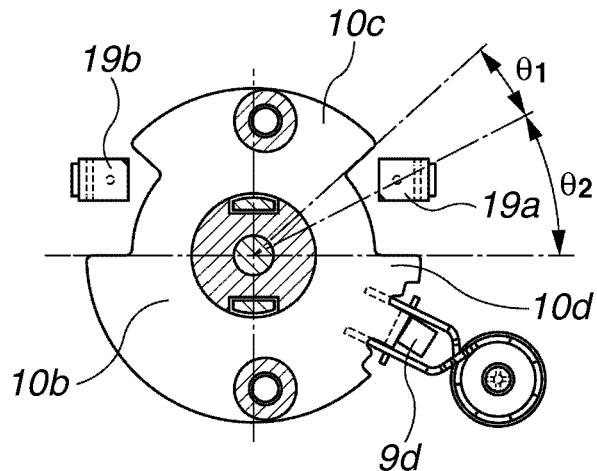
FIGS. 9A through 9C are schematic diagrams illustrating a state in which a zoom lever of the digital camera according to the second exemplary embodiment is at a neutral position.
Figure 9B:
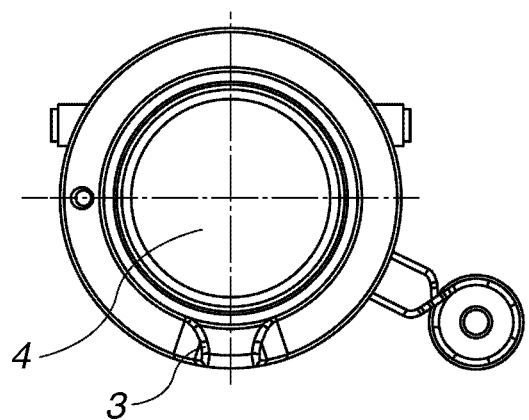
Figure 9C:
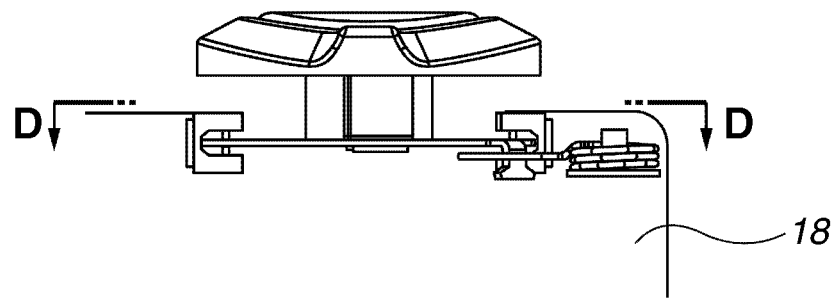

FIGS. 9A through 9C are diagrams illustrating the initial state of the zoom lever 3 in which no operation is being performed on the zoom lever 3 (the rotating angle=0 degrees). FIGS. 9A through 9C are a sectional view, a top view, and a front view of the zoom lever 3.

In the present exemplary embodiment, a main board 18, which is assembled to the main chassis 15 from the front side, has in the upper portion thereof a shallow and wide cutout, on both sides of which there are mounted two photo interrupters 19a and 19b (hereinafter referred to as PIs) constituting detection switches.

The top unit 8 is mounted to the main chassis 15 from above; when the top unit 8 has been mounted, the zoom plate 10 enters the shallow and wide cutout of the main board 18, on which the two PIs 19a and 19b are mounted. In this connection, the depth of the cutout and the positions of the two PIs 119a and 119b are adjusted such that the blade portions 10b, 10c, and 10d of the zoom plate 10 and the two PIs 19a and 19b are flush with each other. In this way, the two PIs 19a and 19b detect the blade portions 10b, 10c, and 10d of the zoom plate 10 in a plane perpendicular to the surface of the main board 18 on which a plurality of electronic components are mounted.

As in the first exemplary embodiment, the blade portions 10b, 10c, and 10d of the zoom plate 10 are arranged so as not to come to the detection positions of the two PIs 19a and 19b in the state in which no operation is being performed on the zoom lever 3. More specifically, the second PI 19b is arranged between the first blade portion 10b and the second blade portion 10c, and the first PI 19a is arranged between the second blade portion 10c and the third blade portion 10d. When the blade portions 10b, 10c, and 10d of the zoom plate 10 enter optical paths constituting the detection positions, the two PIs 19a and 19b detect that the blade portions 10b, 10c, and 10d of the zoom plate 10 have reached the detection positions.

Regarding the method of detecting the operation amount of the zoom lever 3, it is similar to that of the first exemplary embodiment, so a detailed illustration thereof will be left out.

As described above, in the present exemplary embodiment, it is possible to detect the operation amount of the zoom lever 3 and the rotating direction of the zoom lever 3 by means of the two PIs 19a and 19b, enabling to reduce the requisite space for detecting the change in the operation amount of the zoom lever 3.

Further, by using the two PIs 19a and 19b for the detection of the operation amount of the zoom lever 3, there is no need to provide the upper surface board on which the detection switches are mounted in the first exemplary embodiment, so that it is possible to further reduce the requisite space for detecting the change in the operation amount of the zoom lens 3.

Further, by detecting the operation amount of the zoom lever 3 by means of the space of the cutout provided in the main board 18, it is possible to further reduce the requisite space for detecting the change in the operation amount of the zoom lever 3.

In the electronic apparatus discussed in Japanese Patent Application Laid-Open No. 2008-186651, the second switch is switched trough abutment of the end portion in the operating direction of the operation member, so that, when performing zoom operation at the second speed, there is involved a collision sound due to the abutment of the end portion in the operating direction. Thus, when the zoom operation is performed at the second speed at the time of taking a moving picture, which involves the recording of sound, the above-mentioned collision sound is also recorded. In contrast, in the present exemplary embodiment, it is possible to detect the operation amount of the zoom lever 3 without touching the zoom lever 3 due to the two PIs 19a and 19b, so that it is possible to mitigate the operational noise involved when operating the zoom lever 3. It is possible to attain the same effect by using photo reflectors instead of the photo interrupters, which detect the operation amount of the zoom lever 3 in a non-contact fashion.

While in the above-described two exemplary embodiments the present invention is applied to an operation member like the zoom lever 3, which is rotatable with respect to the apparatus main body, the present invention is also applicable to any other type of operation member movable with respect to an apparatus main body, e.g., an operation member capable of linear movement with respect thereto.

While in the above-described two exemplary embodiments the present invention is applied to an operation member for changing zoom magnification, it is also applicable to any other type of operation member corresponding to any other function. For example, the present invention is also applicable to an operation member configured to change a speed at which there is performed an image feeding operation for changing a displayed image to a next image in a reproduction mode in which one of a plurality of images recorded on a recording medium is displayed on an image display unit (not illustrated).

Further, the present invention is also applicable to a function that can be executed in an electronic apparatus other than an imaging apparatus as in the case of the above-mentioned image feeding operation, so that the present invention is applicable to any type of electronic apparatus which allows changing of a control value for the operation of an operation member according to the operation amount of the operation member.

As illustrated above, the above-described two exemplary embodiments have only been presented for the purpose of enabling to carry out the present invention, which means the technical scope of the present invention should not be construed restrictively on account of these exemplary embodiments. The present invention allows various modifications without departing from the technical idea or gist thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-258604 filed Nov. 19, 2010, which is hereby incorporated by reference herein in its entirety.

What is claimed is:

1. An electronic apparatus comprising:
   an operation member rotatable in a first direction and a second direction from an initial state with respect to a main body;
   a first detection unit configured to detect rotation of the operation member in the first direction from the initial state by an angle not less than a first angle, and further configured to detect rotation of the operation member in the second direction from the initial state by an angle not less than a second angle;
   a second detection unit configured to detect rotation of the operation member in the first direction from the initial state by an angle not less than a third angle larger than the first angle, and further configured to detect rotation of the operation member in the second direction from the initial state by an angle not less than a fourth angle smaller than the second angle; and
   a control unit configured to start a first operation when the first detection unit detects rotation of the operation member in a state in which the second detection unit has not detected rotation of the operation member, and to start a second operation different from the first operation when the second detection unit detects rotation of the operation member in a state in which the first detection unit has not detected rotation of the operation member,
   wherein the control unit is further configured to change a control value for the second operation when the first detection unit detects rotation of the operation member in a state in which the second detection unit has detected rotation of the operation member, and change a control value for the first operation when the second detection unit detects rotation of the operation member in a state in which the first detection unit has detected rotation of the operation member.

2. The electronic apparatus according to claim 1, wherein the control unit is further configured to change an amount of change in the second operation when the first detection unit detects rotation of the operation member in a state in which the second detection unit has detected rotation of the operation member, and to change an amount of change in the first operation when the second detection unit detects rotation of the operation member in a state in which the first detection unit has detected rotation of the operation member.

3. The electronic apparatus according to claim 1, wherein the first operation is the operation of changing a zoom magnification in a wide-angle direction, and wherein the second operation is the operation of changing the zoom magnification in a telephoto direction.

4. The electronic apparatus according to claim 3, wherein the control unit is further configured to change the speed of an operation by which the zoom magnification is changed in the telephoto direction to a higher speed when the first detection unit detects rotation of the operation member in a state in which the second detection unit has detected rotation of the operation member, and to change the speed of an operation by which the zoom magnification is changed to the wide-angle direction to a higher speed when the second detection unit detects rotation of the operation member in a state in which the first detection unit has detected rotation of the operation member.

5. The electronic apparatus according to claim 1, wherein the control unit is further configured to change a control value for the second operation when the first detection unit detects rotation of the operation member in a state in which the second detection unit has detected rotation of the operation member, and to restore the control value for the second operation to the value before the change when the first detection unit ceases to detect rotation of the operation member in a state in which the second detection unit has detected rotation of the operation member.

6. The electronic apparatus according to claim 1, wherein the first angle and the fourth angle are the same angle, and wherein the second angle and the third angle are the same angle.

7. The electronic apparatus according to claim 1, wherein the first detection unit and the second detection unit are mounted on a main board of the electronic apparatus.

8. The electronic apparatus according to claim 7, wherein the first detection unit and the second detection unit are further configured to detect rotation of the operation member in a plane perpendicular to a surface of the main board of the electronic apparatus on which a plurality of electronic components are mounted.

* * * * *